United States Patent
Rettig

[11] 3,962,614
[45] June 8, 1976

[54] METHOD FOR CONTROLLING THE OUTPUT CONDITION OF A SELF EXCITED ALTERNATING CURRENT INDUCTION MOTOR

[75] Inventor: Charles E. Rettig, Brookfield, Wis.

[73] Assignee: Litton Industrial Products, Inc., Milwaukee, Wis.

[22] Filed: Oct. 18, 1974

[21] Appl. No.: 515,936

Related U.S. Application Data

[60] Continuation of Ser. No. 337,294, March 2, 1973, abandoned, which is a division of Ser. No. 82,302, Oct. 20, 1970, abandoned.

[52] U.S. Cl. ............................. 318/227; 318/230; 318/231
[51] Int. Cl.² ............................................. H02P 5/40
[58] Field of Search .................. 318/227, 230, 231

[56] References Cited
UNITED STATES PATENTS

| | | |
|---|---|---|
| 3,500,158 | 3/1970 | Landau et al. .................. 318/227 |
| 3,512,067 | 5/1970 | Landau ............................ 318/227 |
| 3,612,971 | 10/1971 | Blaschke et al. ............. 318/230 X |
| 3,670,224 | 6/1972 | Jensen ......................... 318/230 X |
| 3,700,989 | 10/1972 | Jensen ......................... 318/230 X |

OTHER PUBLICATIONS

German Publication, Siemens Zeitschrift (1958), pp. 773–777, Blaschke, Ripperger, Steinkonig.

*Primary Examiner*—Gene Z. Rubinson
*Attorney, Agent, or Firm*—Alan C. Rose; Donald J. Ellingsberg

[57] ABSTRACT

A method for controlling the output torque condition of an induction motor includes the steps of generating a slip frequency in the motor proportional to the desired output torque condition while simultaneously establishing the magnitude and phase displacement of the stator current at preselected values. The invention also obtains the speed control of self excited alternating current motors.

38 Claims, 15 Drawing Figures

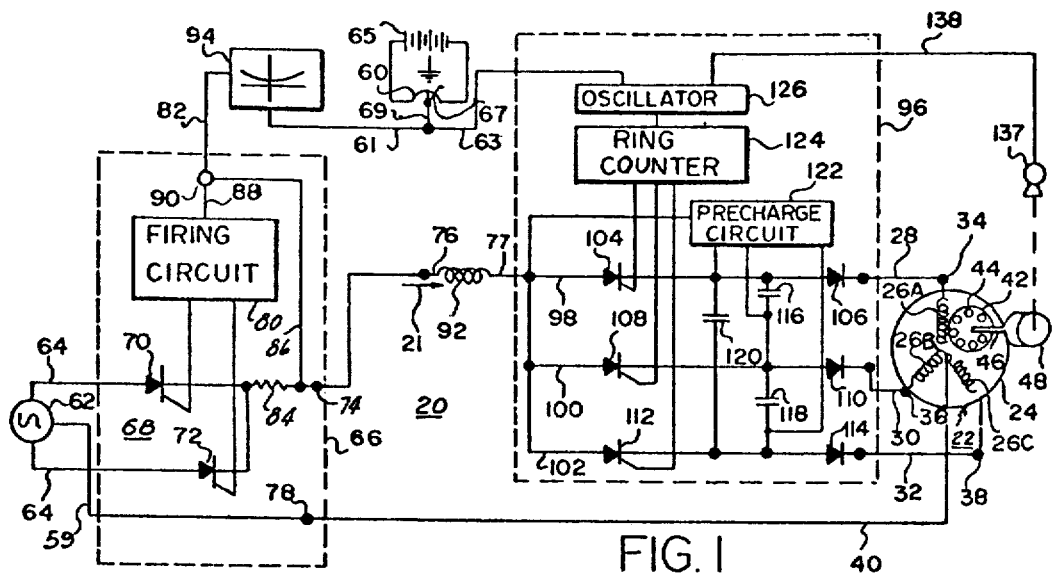
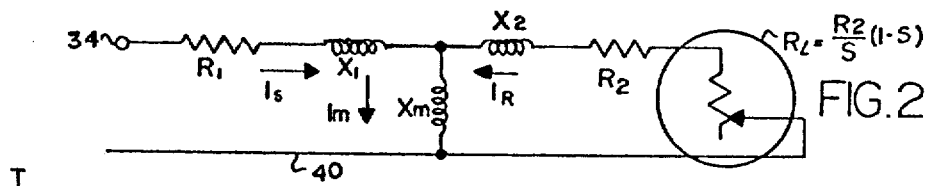
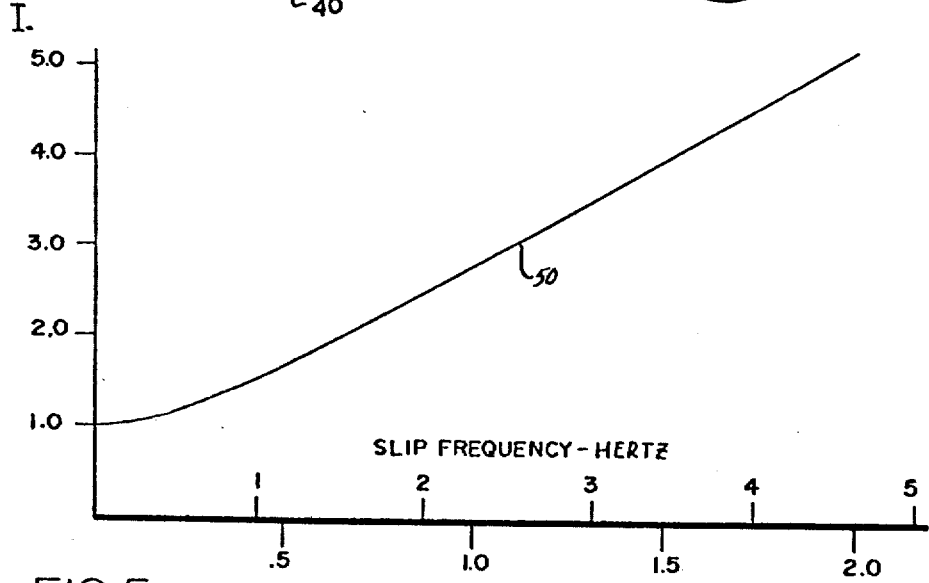

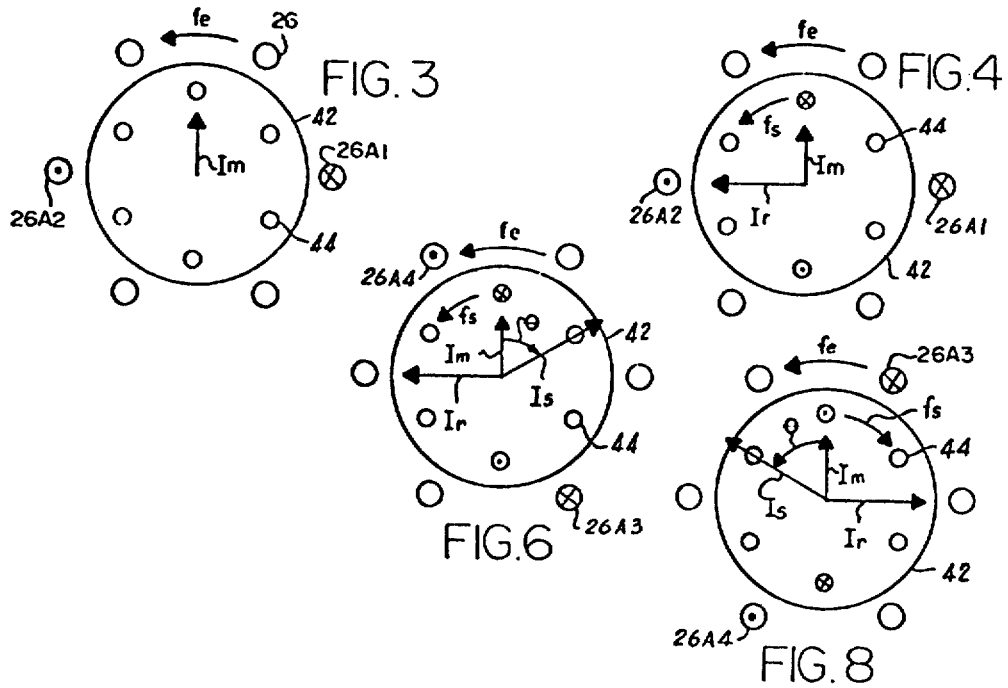
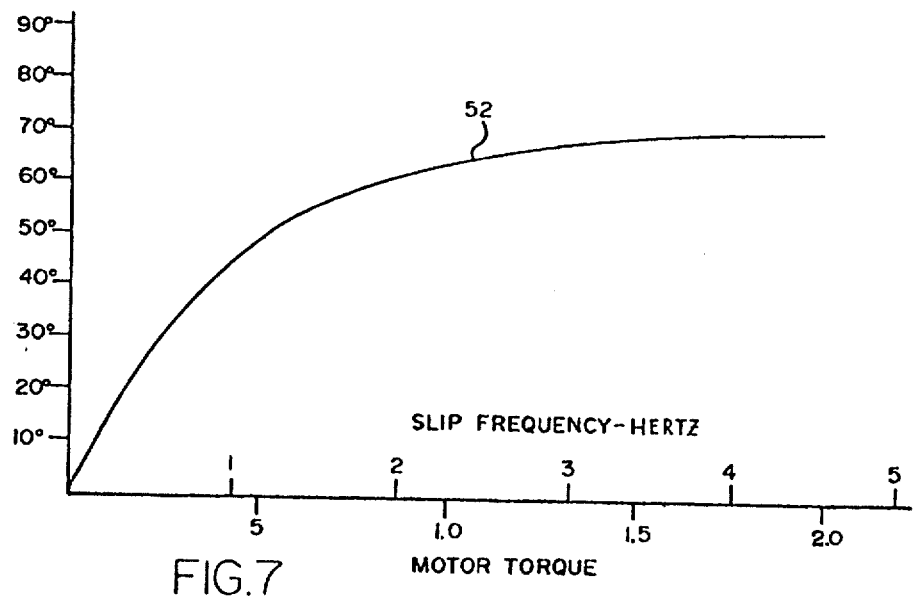

METHOD FOR CONTROLLING THE OUTPUT CONDITION OF A SELF EXCITED ALTERNATING CURRENT INDUCTION MOTOR

CROSS REFERENCE TO RELATED APPLICATION

The present invention is a continuation of application Ser. No. 337,294, filed Mar. 2, 1973, now abandoned, which is a divisional application of copending application Ser. No. 82,302 filed Oct. 20, 1970 and now abandoned.

BACKGROUND OF THE INVENTION

1. Field of the Invention

The present invention relates to the control of self excited alternating current induction motors and more particularly to the torque control of such motors.

2. Description of the Prior Art

Self excited alternating current motors, for example, induction motors, possess the highly desirable qualitites of design simplicity and mechanical ruggedness. These attributes suggest the ready application of such motors in commercial and industrial apparatus. However, control of the output condition, such as the speed, torque, or power, of induction motors in the manner necessary for such applications is difficult and has substantially limited their usage.

To some extent, the difficult in controlling such motors results from the same mechanical simplicity which increases their utility. Self excited alternating current motors consist of a flux producing stator winding distributed in a stator core surrounding a cage of rotor current conductors and shorting end rings embracing a rotor core. There is no direct electrical connection to the rotor, as by commutators, slip rings or the like. While the absence of commutators or slip rings and brushes eliminates the numerous problems associated therewith, the lack of an electrical connection to the rotor also prevents direct control of electrical conditions in the rotor. The electrical condition of the rotor can be controlled only indirectly by the enrgization of the stator winding.

Further, the speed of an alternating current motor is dependent, in great part, on the frequency of the alternating current applied to the motor and in the usual case, the most readily available power source is a constant frequency, constant voltage power source, for example, 60 Hertz, 240 volt power mains. Operation of an alternating current motor from such a power supply severely limits its application since the output characteristic exhibited is that of constant speed operation.

To provide variable speed operation to alternating current motors, variable frequency, variable voltage power supplies have been utilized. While the use of such power supplies permits control of the output condition of the motor, severe problems have been encountered in establishing and maintaining the desired output condition. This prevents attainment of truly satisfactory operation. These problems arise, in part, because small errors in the magnitude and phase displacement of the voltage applied to the motor can cause large errors in the current drawn from the variable voltage power supply and large errors in the output condition of the motor, making control of the applied voltage extremely critical.

Other problems occur when the operative condition is varied and arise because of the complexity of the operative relationships occurring in the motor under such circumstances. These transient phenomena include factors such as the leakage reactance time constant of the motor, the flux time constant of the motor, and the mechanical time constant of the rotor and the motor load. The occurrence of these conditions make mathematical analysis of the phenomena and the motor output condition difficult and impede the design of a satisfactory electric regulator of the voltage control type.

The present invention overcomes the shortcomings of such prior art motor controls by means of a motor control method, the operation and structure of which may be characterized as current controlling. This is in contradistinction to the prior art motor controls of the voltage type. While current controls have been described, such controls are not commonly known or used at present. The article by F. Blaschke et al. in the German publication "SiemensZeitschrift", Vol. 42, No. 9, pages 773–777 (1968) shows a motor control of the current type controlling a self excited alternating current motor. However, the described control is extremely complex in structure and control technique, requiring numerous feedback loops which defeat the inherent simplicity of current controls, hereinafter noted. Further, the described control is subject to an oscillatory condition which prevents the attainment of satisfactory operation.

The advantage of motor control of the current type over those of the voltage type reside in the fact that electric motors are essentially torque producing devices and that current, rather than voltage, is the basic torque producing quantity. While voltage may be related to current and thus to motor torque, the relationship between voltage and current is a complex one involving the motor leakage reactance and other phenomena. The complexity of this relationship accounts for the above-mentioned difficulty in obtaining satisfactory operation by controlling the applied voltage.

SUMMARY OF THE PRESENT INVENTION

The motor control method of the present invention employs current control to obtain direct regulation of the output torque condition of an induction motor, greatly enhancing the control of the motor. By novel use of various torque producing factors in the motor, the present invention retains the theoretical simplicity of the current controlling type of motor control. By further novel use of an additional torque producing factor in the motor, the present invention overcomes the oscillatory condition found in prior art controls to provide highly responsive, yet stable, operation to standard self excited alternating current motors over the entire operative range thereof.

Other features of the present invention include the attainment of uniformly high torque per ampere at all motor speeds including zero, the development of high starting torque in the motor, precise control of motor speed, smooth reversal of rotary direction without interruption of output torque, smooth and rapid transition from the motoring to the regenerative mode of operation, and vice versa, and high efficiency in both the motor control and the motor controlled thereby.

The present invention resides in the identification of certain torque producing factors in the motor and the interrelationship of these factors. The invention further resides in the control of these factors and their interrelationship by current controlling techniques, specifically, control of the magnitude and frequency of the stator current applied to the stator winding of the motor.

Briefly, the operative condition of a self excited alternating current motor of the induction type may be defined by considering the relative magnitudes and phase displacements of the rotor current, the motor mutual flux and corresponding exciting current, and the stator current. Under conditions of constant motor flux, the rotor current bears a substantially fixed phase relationship with the flux producing exciting current. Furthermore, the rotor current and motor torque are proportional to the slip frequency developed in the motor. The motor flux may be maintained constant by controlling the magnitude of the stator current as a function of the motor slip frequency. Additionally the response of the motor may be greatly improved by controlling the phase displacement of the stator current with respect to the exciting current as a function of the slip frequency.

The motor slip frequency to which the foregoing factors are proportional or related is generated by establishing the frequency of the stator current energization at a value equal to the algebraic summation of the rotor frequency and a slip frequency proportional to the output torque to be produced. Simultaneously, the magnitude of the stator current is established at a level which retains the motor flux constant as the desired output torque condition is developed. The phase displacement of the stator current may also be altered as a function of slip frequency to maintain constant motor flux while permitting immediate generation of the rotor current in its proper, torque producing phase displacement relative to the exciting current. A current regulated power supply and a frequency control means, such as an inverter, may be employed for the foregoing purposes.

The above mentioned slip frequency may be generated by applying a stator current of a fixed frequency to the stator winding and allowing the torque load applied to the motor to alter the rotor speed by the amount necessary to obtain the required slip frequency. In cases in which the speed of the motor rotor is relatively constant, the required slip frequency may be generated by altering the frequency of the stator current energization.

The output torque condition of the motor may be controlled, responsive to a speed error signal, for providing speed regulation to the motor.

BRIEF DESCRIPTION OF THE DRAWINGS

FIG. 1 is a schematic diagram of one embodiment of an induction motor torque control suitable for practicing the method of the present invention.

FIG. 2 is a schematic diagram of an equivalent circuit for a self excited alternating current motor of the induction type.

FIGS. 3, 4, 6 and 8 are diagrammatic representations of an induction motor showing electrical and mechanical phenomena appearing in the motor as a result of the performance of the method of the present invention.

FIG. 5 is a graph showing the relationship of stator current to motor slip frequency and motor torque output.

FIG. 7 is a graph showing the relationship of the phase displacement of the stator current to motor slip frequency and motor output torque condition.

DESCRIPTION OF THE PREFERRED EMBODIMENT

METHOD OF OPERATION

Figure 9:
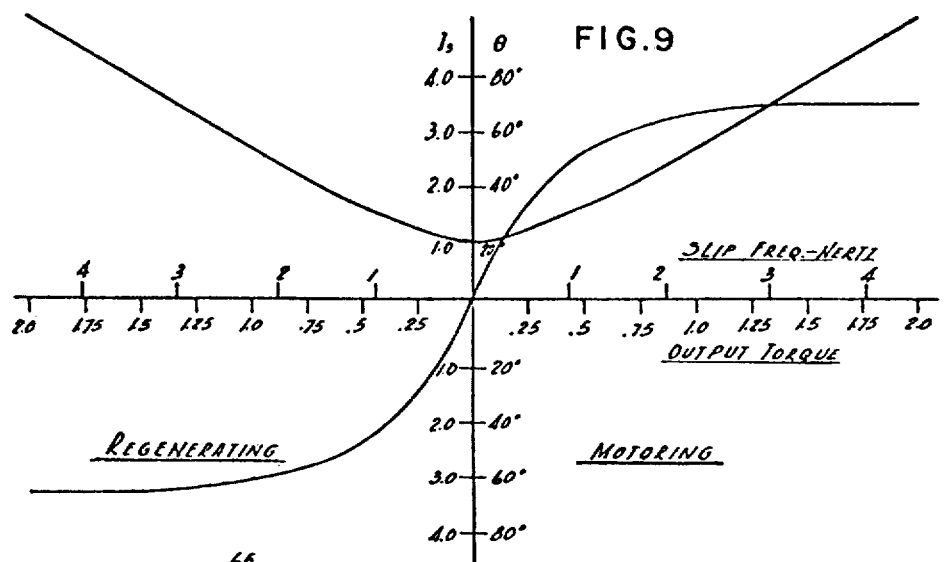
FIG. 9 is a composite of the graphs of FIGS. 5 and 7 showing the aforesaid relationships for both the motoring and regenerative operating modes of the motor.

Inasmuch as motor control 20 of the present invention is directed to the torque control of induction motors, the Description of the Preferred Embodiment commences with a disclosure of the improved torque control method of the present invention.

Alternating current induction motor 22, used for illustrative purposes, includes a stator 24 of conventional laminated iron core construction having polyphase winding 26 disposed therein for generating a revolving magnetic flux when energized. Stator winding 26 includes stator coils 26A, 26B, and 26C interconnected to form a conventional star connected stator winding. Stator coils 26A, 26B and 26C are energized by supply lines 28, 30 and 32 connected to the corresponding motor input terminals 34, 36 and 38. A neutral conductor 40 is connected to the center tap of star connected stator winding 26.

Stator 24 surrounds rotor 42 having rotor conductors 44 circumferentially spaced in a laminated iron core. The rotor output shaft 46 is connected to the load 48 of motor 22.

The electrical equivalent of the above described alternating current induction motor 22 is shown in the equivalent circuit diagram of FIG. 2. This diagram is applicable to the analysis of fundamental components of the indicated electrical quantities. FIG. 2 shows a single phase of motor 22 it being understood that the other phases have similar equivalent circuits. Terminal 34 is a one of the terminals of motor and conductor 40 is the neutral conductor. Resistance $R_1$ and reactance $X_1$ are the stator resistance and leakage reactance, respectively. Reactance $X_m$ is the mutual reactance of the rotor and stator windings. Reactance $X_2$ and resistance $R_2$ are the rotor leakage reactance and rotor resistance, respectively. In a properly designed alternating current motor, the stator and rotor leakage reactances are small compared to the mutual reactance of the motor. Resistance $R_L$ is a variable resistance representing the internal mechanical power of the motor.

FIG. 2 also shows the various currents appearing in motor 22. Current $I_m$ flowing through the mutual reactance $X_m$ of the motor creates the motor flux. Current $I_m$ is often termed the exciting current. Current $I_r$, flowing through the rotor circuit comprised of reactance $X_2$ and resistances $R_2$ and $R_L$, is the load current which interacts with the motor flux to produce motor torque. Current $I_s$ is the current supplied to the stator terminals of motor 22.

The consideration of the generation of the motor torque may best be commenced an analysis of the operational state of motor 22 under conditions in which stator winding 26 is energized but no torque is generated by motor 22. It will be appreciated that the only such operative state is one in which rotor 42 is rotating at the same speed as, or synchronously with, the revolving magnetic flux of stator winding 26. With rotor 42 rotating in synchronism with the revolving magnetic flux of motor 22, no rotor conductors 44 cut any lines of the flux and no voltage or current is induced in rotor conductors 44. The stator current $I_s$ and the exciting current $I_m$ flowing through the mutual inductance are equal.

The operative condition of motor 22 with rotor 42 rotating at synchronous speed is shown in FIG. 3 in which portions of motor 22 are shown in diagrammatic and schematic form. FIG. 3 shows stator winding 26 embracing rotor 44. Stator winding 26 is energized with cyclical current, for example, alternating current, the instantaneous energization of two stator conductors 26A1 and 26A2 being such that current enters the plane of the paper in conductor 26A1, as shown by the cross indicating the tail of the current arrow, and exits from the plane of the paper in conductor 26A2, as shown by the dot indicating the head of the current arrow.

The application of current to stator winding 26 produces a magnetic flux in motor 22 by virtue of the exciting current $I_m$ flowing through the mutual reactance $X_m$ of the motor. The magnitude of the mutual flux is substantially proportional to the magnitude of the exciting current $I_m$. The orientation of this magnetic flux is established at right angles with the plane of stator conductors 26A1 and 26A2 in accordance with the well known principles of electromagnetics, as shown by the vector of FIG. 3 Because of the immutable relationship between the motor flux and the exciting current $I_m$, and because the motor control of the present invention acts to control the output torque condition of motor 20 by the controlling, among other factors, the current relationships in the motor, it is helpful to designate the vector in FIG. 3 as a current quantity, i.e. the exciting current $I_m$ used to create the motor flux, rather than designating it as the motor flux. Such a convention is hereinafter followed, as indicated by the designation of the vector of FIG. 3 as the exciting current $I_m$. The length of the vector is an indication of the magnitude of the exciting current $I_m$. Since the exciting current $I_m$ is the same as the stator current $I_s$, for the no torque condition shown in FIG. 3, vector $I_m$ is also representative of the stator current $I_s$.

To describe the operation of motor 22, a reference datum commonly termed the synchronously rotating frame of reference is used. As shown in FIG. 3, the vector $I_m$ is stationary with respect to this frame of reference since it is synchronously rotating due to the cyclical current energization of stator winding 26 and may thus be used as a reference point. With respect to reference vector $I_m$, the stator conductors rotate past the vector at a frequency $f_e$ corresponding to frequency of the applied cyclical stator current. Since rotor 42 is rotating at synchronous speed, it is stationary with respect to vector $I_m$ and no relative rotation of rotor 42 is shown in FIG. 3.

To describe certain phenomena in motor 22, it is necessary to consider the frequency of rotation of rotor 42 with respect to the stationary stator winding. As used herein, the rotor frequency of rotor 42 is the number of times a sensing point on the rotor passes a given point on the stator winding, for example, a given stator conductor. The rotor frequency of a given motor may be easily comprehended and visualized by counting the number of times the north poles of the rotor pass a given stator conductor in a given period of time. In the no torque condition of motor 22 shown in FIG. 3, the rotor frequency $f_r$ is equal to the frequency of the cyclical current $f_e$ applied to stator winding 26.

In order to produce torque in motor 22, it is necessary that a rotor current $I_r$ appear in motor 22. This, in turn, requires that a slip, or speed differential between the synchronous speed of the rotating magnetic field and the speed of rotor 42 appear in motor 22. As noted hereinafter, this speed differential may be obtained in two ways: by applying a load to rotor 42 so that it slows from its no torque condition or by increasing the speed of rotation of vector $I_m$, as by increasing the frequency of the cyclical current $f_e$ applied to stator winding 26. A slip frequency $f_s$ thus appears in motor 22. The algebraic sum of the rotor frequency $f_r$ and slip frequency $f_s$ must equal the frequency of the cyclical current $f_e$ applied to stator winding 26.

With rotor 42 rotating under slip conditions, a voltage is induced in rotor conductors 44 as they cut the lines of flux represented by vector $I_m$, creating a current $I_r$ in the rotor conductors. Applying the right hand rule which relates conductor motion, field direction, and current flow, the polarity of the voltage and the flow direction of the current is as shown in FIG. 4. Assuming the slip frequency $f_s$ is low, the rotor reactance is low compared to the rotor resistance so that the rotor circuit is mainly resistive. This causes the rotor current to be in phase with the rotor voltage and to appear as positioned by the vector $I_r$ in FIG. 4 at a phase displacement of substantially 90° with respect to vector $I_m$.

The output torque of motor 22 is generated by the interaction of the rotor current $I_r$ and the motor fluxx and is generally proportional to the product of the two. It will be appreciated that the rotor voltage will be directly proportional to the slip frequency $f_s$, i.e. the speed at which the rotor conductors cut the lines of the flux indicated by the vector $I_m$. As long as the rotor impedence is mainly resistive, i.e. at low slip frequencies, the rotor current $I_r$ will also be proportional to slip frequency and phase displaced as shown in FIG. 4. Under conditions of constant motor flux, the proportionality between rotor current and slip frequency causes the output torque of motor 22 to be proportional to slip frequency $f_s$. The range through which the proportionality between torque and slip frequency exists is termed the normal operating range of the motor.

A desired output torque condition in motor 22 may thus be established under constant motor flux conditions by generating the desired slip frequency $f_s$ in motor 22. The generation of this slip frequency in the motor may be obtained by varying the frequency of the alternating current $f_e$ applied to stator winding 26. This process of generating the desired slip frequency may, for purposes of analysis, be considered in two steps. First, the frequency of the alternating current applied to stator winding 26 is adjusted to equal the rotor frequency $f_r$ existing in the rotor. Then, the frequency of the stator current is altered by an amount equal to the slip frequency $f_s$ and torque desired to be generated in motor 22. The frequency of the stator current $f_e$ thus becomes equal to the algebraic sum of the existing rotor frequency $f_r$ and a slip frequency $f_s$ proportional to the torque to be produced.

It must be appreciated that the aforesaid proportionality of torque and slip frequency may be made to exist for any frequency of cyclical current energization applied to stator windings 26 of motor 22. To obtain the torque-slip frequency proportionality, the flux of the motor must be held constant as the frequency of the cyclical current applied to motor 22 is varied. With the motor flux maintained at a constant level, similar slip frequencies in the motor will produce identical rotor current and torque, regardless of the frequency of the cyclical current energization applied to stator windings 26.

Turning now to a consideration of the stator current $I_s$, once a load, or rotor, current appears, the stator current $I_s$ is no longer co-equal with the exciting current $I_m$, but rather, must reflect the presence of the rotor current $I_r$. Specifically, in order to maintain the aforesaid proportionality between slip frequency and motor torque, the stator current $I_s$ must now both maintain the exciting current $I_m$ and the motor flux constant and, at the same time, reflect the presence of the rotor current.

When a rotor current $I_r$ appears, the stator current $I_s$ must increase in value to overcome the effect of the rotor current. For any given motor, the increase in stator current $I_s$ necessary to maintain the exciting current $I_m$ and motor flux constant and to offset the effect of the rotor current generated over a range of slip frequencies may be ascertained by calculation or test. Maintaining the exciting current constant as the rotor current varies maintains the motor output torque-slip frequency proportionality.

FIG. 5 shows, in graphical form, the variations in the magnitude of the stator current $I_s$ with respect to slip frequency necessary to maintain motor output torque proportional to slip frequency over a range of the latter. The graph is developed for a typical 7.5 horsepower, 4 pole alternating current induction motor 22 which may be presumed to develop rated torque at a slip frequency of approximately 2.3 Hertz.

The abscissa of the graph of FIG. 5 shows slip frequency in Hertz. Since slip frequency is proportional to motor torque under constant flux conditions in motor 22, the abscissa is also labeled in terms of motor output torque. The torque is shown on a per unit basis for simplicity with rated torque assigned a per unit value of 1 and the other relative torque values shown accordingly. FIG. 5 shows stator current conditions for the normal operating range of motor 22 of from zero to rated torque and for an equal range above the operating range, up to twice rated torque. The normal operating range of the motor covers slip frequency 0 to 2.3 Hertz. Twice rated torque is generated at a slip frequency of approximately 4.6 Hertz.

The ordinate scale of the graph of FIG. 5 shows the per unit magnitude of the stator current $I_s$. The magnitude of the stator current $I_s$ in the no output torque operating condition of motor 22 is assumed to have a per unit value of 1. Since the exciting current $I_m$ is the same as the stator current $I_s$ under no torque conditions it also has a per unit value of 1. The value of the exciting current $I_m$ remains at a per unit value of 1 throughout the various torque output conditions of motor 22 in order to maintain the flux constant. The plot 50 of FIG. 5 shows the stator current condition and rotor slip frequency necessary to generate a desired output torque condition from motor 22. Since the exciting current has a constant per unit value of 1, plot 50 also shows the ratio of stator current $I_s$ to exciting current $I_m$.

As noted above, in the no torque condition of motor 22, as shown in FIG. 3, the slip frequency is zero and the stator current $I_s$ and the exciting current $I_m$ are identical, both having a per unit value of 1, all as shown in FIG. 5.

Assume now it is desired to provide an output torque of 0.25 rated torque. Reference to the plot 50 of the graph of FIG. 5 indicates that an output torque of 0.25 rated torque, as plotted on the abscissa, requires the stator current $I_s$ to have a value of approximately 1.2, as plotted on the ordinate, in order to maintain the exciting current at a per unit value of 1 and offset the effect of the rotor current necessary to generate 0.25 rated torque. A slip frequency of $0.57H_z$ must appear in motor 22 as indicated by the abscissa of the graph of FIG. 5. This may be generated by increasing the frequency of the stator current by $0.57H_z$. When a stator current $I_s$ of a per unit value of 1.2 is applied to stator winding 26 and a slip frequency of $0.57H_z$ appears in motor 22, 0.25 rated torque will be generated by motor 22. It will be appreciated that any value of rated torque may be generated by reference to the graph of FIG. 5 and by applying a stator current of the correct magnitude to stator winding 26 and generating a slip frequency of the correct magnitude in motor 22. The desired rotor slip frequency may be obtained by establishing the frequency of the stator current $f_e$ at a value equal to the algebraic sum of the existing rotor frequency $f_r$ plus the desired slip frequency $f_s$.

It is also important to note that, in order both to maintain the exciting current $I_m$ and motor flux constant and to offset the effect of the rotor current, the stator current $I_s$ must be in phase displacement with respect to the exciting current. This may be more fully appreciated by reference to FIG. 6 and the vectors shown therein. FIG. 6 is identical to FIG. 4 except in that it shows vector $I_s$ representing the stator current $I_s$ provided at a phase or angular displacement of $\theta$ with respect to vector $I_m$. To establish this position of vector $I_s$, it is moved from its no load position, in which it was coincident with vector $I_m$, through the angle $\theta$ to the position shown in FIG. 6. The length of the vector $I_s$ must also be increased. The amount of this increase is ascertained from the graph of FIG. 5 in accordance with the slip frequency $f_s$ of motor 22. With vector $I_s$ positioned as shown in FIG. 6, it will be readily apparent that the unaltered vector $I_m$ is the vector sum of vector $I_r$ and vector $I_s$, since vector $I_s$ has a horizontal vector component equal, but opposite, to vector $I_r$ and a vertical vector component equal to the exciting current $I_m$.

For an output torque condition of any given magnitude, there will be an angular or phase displacement of the stator current $I_s$, which when coupled with changes in the magnitude of the stator current $I_s$ as shown in FIG. 5, will maintain the exciting current $I_m$ constant so that the given magnitude of output torque may be obtained by operating motor 22 at the required slip frequency. FIG. 7 shows in graphical form, the angular displacement $\theta$ of the stator current $I_s$ from the no output torque position of FIG. 3, i.e. the phase displacement from the exciting current $I_m$, with respect to slip frequency for the same motor used in connection with FIG. 5. FIG. 7 is similar to FIG. 5, except that the ordinate of the graph is calibrated in degrees and is used to show the angular displacement $\theta$ of the stator current $I_s$ from the no torque position. The plot 52 of the graph of FIG. 7 shows the angular displacement $\theta$ with respect to slip frequency.

In the no torque condition of motor 22, shown in FIG. 3, the slip frequency is also zero and there is no angular displacement $\theta$ between the stator current $I_s$ and the exciting current $I_m$, as shown in FIG. 7.

Assume now it is desired to provide an output torque of 0.25 of rated torque. Reference to the plot 52 of the graph of FIG. 7 indicates that an output torque of 0.25 rated torque, as plotted on the abscissa, requires that the angular displacement between the stator current $I_s$ and the exciting current $I_m$ be approximately 31°. When a slip frequency of $0.57H_z$ appears in motor 22 and a stator current of 1.2, as determined by the graph of FIG. 5 is applied to stator winding 26 at a phase displacement of approximately 31° from the no torque position, the desired output torque condition of 0.25 will be generated at the output of motor 22.

In a similar manner, any desired value of output torque may be obtained by providing the proper slip frequency in motor 22 and the proper magnitude and phase displacement for the stator current $I_s$. For example, to generate an output torque of 1.5 rated torque, reference to the graphs of FIGS. 5 and 7 indicates that a slip frequency of 3.4 Hertz must be generated in motor 22. The stator current $I_s$ must have a per unit value of approximately 3.8 and be phase displaced through an angle $\theta$ of approximately 69°. The method of the present invention thus obtains improved torque control of self excited alternating current motors of the induction type by establishing the motor slip frequency, the magnitude of the stator current, and the phase displacement of the stator current.

The motor slip frequency may be established by the frequency of the cyclical current $f_e$ applied to the stator winding. The rotor frequency $f_r$ of rotor 42 is ascertained, as by a tachometer generator, and the frequency of cyclical current $f_e$ applied to stator winding 26 altered by an amount which will produce the desired slip frequency $f_s$ in motor 22. The motor slip frequency may also be established by maintaining the existing stator frequency $f_e$ constant while altering the rotor frequency $f_r$ of rotor 42 as by applying or removing torque load from output shaft 46 of motor 22. In either case the frequency of the cyclical current $f_e$ is equal to the algebraic sum of the rotor frequency $f_r$ and the slip frequency $f_s$. However, with the former technique the slip frequency is generated immediately whereas in the latter case the inertia of rotor 42 and the load must be overcome before the desired slip frequency is established.

Control of the magnitude of stator current $I_s$ is facilitated by the use of a current regulated power supply which provides a stator current of the desired magnitude. This overcomes the numerous problems encountered with voltage type power supplies.

In regard to the matter of establishing the proper phase displacement of the state current $I_s$ with respect to its no torque position, it may be noted that whenever a torque load is applied to motor 22, a phase displacement between stator $I_s$ and exciting current $I_m$ must appear if the necessary rotor current $I_r$ and the output torque of the motor is to be generated. The operation of the motor itself, in a period of time subsequent to the application of the torque load will cause the angular displacement to occur. When the motor is energized from a current power source without phase displacement, the vector $I_m$ and the vector $I_r$ are displaced with respect to vector $I_s$ since the position of vector $I_s$ is relatively fixed by the power source. When operating an induction motor with a low percent of slip, the magnitude of the aforesaid time period, when taken in conjunction with other factors, may be such as to produce a prolonged oscillatory condition.

The transient response of motor 22 may be increased by altering the electrical energization of stator winding 26 to effect the desired angular displacement of the stator current $I_s$ electrically, rather than permitting the operation of the motor to effect the phase displacement electro mechanically. Thus, rather than instantaneously energizing stator conductors 26A1 and 26A2 as shown in FIG. 3, stator conductors 26A3 and 26A4, displaced from stator conductors 26A1 and 26A2 by an angle corresponding to angle $\theta$ may be energized to generate vector $I_s$, shown in FIG. 6, in the desired position. Because the reactance in the stator current paths, i.e. the leakage reactance $X_1$ of the stator windings, is small, the angular displacement of the stator current applied to the stator winding 26 may be effected almost instantaneously. The response of motor 22 in establishing the desired output torque condition is thus increased.

FIGS. 3, 4, and 6 and the graphs of FIGS. 5 and 7 show operation of motor 22 in the motoring condition. Motor control 20 of the present invention is equally capable of controlling motor 22 when it is in the regenerative state, that is, when rotor 42 is rotating faster, rather than slower, than the synchronous speed of vector $I_m$. Under such conditions, the direction of relative rotation of rotor 42 with respect to vector $I_m$ is opposite from that shown in FIGS. 3 and 4, as shown in FIG. 8. This reverses the polarity of the induced voltage and the flow direction of the current in rotor 42, requiring the angular displacement of the vector $I_s$ to occur in the opposite direction from that shown in FIG. 6. Under conditions of regenerative operation energization of stator winding 26 generates a retarding torque rather than an accelerating torque, on rotor 42. To obtain the desired slip frequency $f_s$ in motor 22, the rotor frequency $f_r$ may be ascertained and the frequency of the stator current $f_e$ reduced below the rotor frequency $f_r$ by an amount equal to the slip frequency $f_s$. The relationship between the magnitude and phase displacement of the stator current and the slip frequency is the same regardless of whether the torque of the motor is motoring or regenerating. The graphs of FIGS. 5 and 7, expanded to include both motoring and regenerative operation, are shown in FIG. 9 which reflects the opposite displacement of the stator current vector $I_s$ in regenerative operation but the similarity in current magnitudes in motoring and in regenerative operation.

By the interrelated control of slip frequency and stator current magnitude, the method of the present invention provides an improved technique of controlling the output torque condition of an alternating current self excited motor of the induction type in both the motoring and regenerative states. By further controlling the phase displacement of the stator current as a function of the slip frequency, the method of the present invention improves the response of such a motor to changes in motoring or regenerative output torque conditions.

By virtue of the precise control of the motor output torque condition provided by the above described method, the speed of an induction motor may be precisely controlled in both the motoring and regenerative operating modes. For this purpose, the speed error is detected in motor 22. The speed error is used to simultaneously control the magnitude, frequency, and if desired, the phase displacement of the stator current to adjust the output torque condition of motor 22. The output torque adjustment is made in a manner tending to reduce the speed error.

The motor output torque is held to a preselected value in the event of excessive speed error conditions by limiting the magnitude and phase displacement of the stator current and altering its frequency so as to limit the slip frequency developed in the motor.

THE MOTOR CONTROL

Returning now to FIG. 1, there is shown therein motor control 20 of the present invention for effecting operation of induction motor 22 in accordance with the above described method.

Motor control 20 is operable to provide a desired output torque condition of motor 22 in response to an input torque command signal corresponding to the desired output torque condition. Since the desired output torque condition is proportional to slip frequency, the input signal is also proportional to slip frequency. This torque command signal may be selected by manipulation of a signal means or control device shown diagrammatically as potentiometer 60. Potentiometer 60 is energized by a center grounded battery 65. The wiper 67 of potentiometer 60 provides the torque command signal in conductor 69.

Control 20 is energized from a source of alternating current power 62 which typically supplies 60 Hertz power mains 64. Power source 62 is connected to current regulated power supply 66 through power mains 64 and center tap conductor 66. Supply 66 may include a full wave rectifier 68 having the anodes of controlled rectifiers or thyristors 70 and 72 connected to power mains 64. The cathodes of the controlled rectifiers are connected to output terminals 74 and conductor 76. The direct current output of supply 64 appears at output terminal 74 and at output terminal 78 located between conductor 66 and conductor 40. The arrow identified by the number 21 in FIG. 1 indicates the output current of supply 66 and its direction of flow out of output terminal 74 and into output terminal 78.

The magnitude of the direct current 21 provided by power supply 66 is controlled by firing circuit 80 which supplies signals to the gate terminals to the controlled rectifiers. Firing circuit 80 may be any firing circuit suitable for providing firing signals to the controlled rectifiers at desired firing angles, responsive to a current reference signal in conductor 82 and to one or more current feedback signals applied to the firing circuit. For example, firing circuit 80 may be a biased sine wave, phase shift firing circuit such as is shown on page 434 of J. Millman and S. Seely, *Electronics* (1941).

A simplified current regulation circuit is exemplarily shown in connection with supply 66 in FIG. 1 including an output current sensing means, such as resistor 84 in conductor 76 which provides a feedback signal corresponding to the actual output current 21 of supply 66 in conductor 86. The signal in conductor 86 is compared with the signal corresponding to the desired current in conductor 82 at summing junction 88 and a current error signal provided in conductor 90 to firing circuit 80. The regulation provided by the aforementioned feedback signal and circuitry causes the actual output current of supply 66 to approach the desired current as selected by the reference signal in conductor 82.

An inductor or choke 92 is interposed in conductor 76 to prevent any rapid changes in the magnitude of direct current 21, to absorb short duration voltage transients, and to smooth out the current produced in the power supply. Current regulated power supply 66 and inductor 92 thus form a current source which provides current 21 of the desired magnitude in conductor 77 to the remaining portions of motor control 20.

The magnitude of current 21 is determined by function generator 94. As is generally defined in the art, and is used herein, a function generator comprises circuitry for providing an output signal which is a given function of the input signal. This may include simple proportionality as well as more complex relationships. Function generator 94 has as its input signal, the torque command signal from potentiometer 60 in conductor 61 and provides an output signal to firing circuit 80 in conductor 82 for providing current 21 from current regulated direct current power supply 66 corresponding to the magnitude of stator current $I_s$ necessary both to maintain the exciting current constant and offset the effect of the rotor current so as to provide the output torque condition of rotor 22 commanded by the torque command signal. Thus, function generator 74 relates motor torque as evidenced by the torque command signal to stator current $I_s$, as the output signal in conductor 82, so that the relation or function between the input signal and output signal of function generator 94 may be shown by the graph 50 of FIG. 5. Since the torque command signal may command either motoring or regenerative torque, the function of function generator 94 resembles the graph 50 of FIG. 9. The graph is reproduced in the block schematically representing function generator 94 in FIG. 1. As an alternative, the signal applied to function generator 94 may be rendered unipolar so that the graph 50 of FIG. 5 represents the function of function generator 94.

Numerous types of circuits may serve as function genertor 94. For example, a plurality of resistors providing the output signal in conductor 82 may be selectively connected, as by breakover diodes, as the magnitude of the torque command input signal varies to provide the desired relationship between the input and output signals of function generator 94.

Motor control 20 must also contain a frequency control means. In the embodiment of motor control 20 shown in FIG. 1, such a means comprises an inverter 96 for inverting direct current 21 into alternating current for application to stator winding 26 of motor 22 as stator current $I_s$. It has been found highly desirable to use the trapped charge or capacitor commutated, diode isolated inverter 96 shown in FIG. 1 for this purpose.

Inverter 96 comprises three parallel current paths 98, 100, and 102 extending between conductors 76 and output conductors 28, 30 and 32. Controlled rectifier 104 and diode 106 are connected in series in current path 98. Controlled rectifier 108 and diode 110 are connected in series in current path 100 and controlled rectifier 112 and diode 114 are connected in series in current path 102.

A commutating capacitor is connected across each pair of current paths to effect turn off of the controlled rectifiers 104, 108 and 112. Capacitor 116 is connected across current paths 98 and 100, capacitor 118 is connected across current paths 100 and 102, and capacitor 120 is connected across current paths 98 and 102. To assist in the start up of inverter 96, a precharge circuit 122 is connected to the capacitors and to conductor 77.

Controlled rectifiers 104, 100 and 102 are fired, or rendered conductive, by a firing means which may typically consist of ring counter 125 and oscillator 126. Oscillator 126, which may be of the capacitor controlled, unijunction transistor relaxation type, generates a series of firing pulses to ring counter 124. The frequency of generation of these pulses is dependent on the two factors represented in two separate signals or in one combined signal applied to oscillator 126. One of these signals is provided from tachometer generator 137 in conductor 138. Tachometer generator 137 is connected to output shaft 46 and provides a signal in conductor 138 proportional to the rotor frequency of rotor 42, which causes oscillator 126 to generate pulses at a frequency corresponding to the rotor frequency $f_r$ of rotor 42. The second of these signals is the torque command signal from potentiometer 60 in conductor 63 which increases or decreases the rate of pulse generation by the amount of the desired slip frequency $f_s$ in motor 22. The rate of pulse generation is increased during motoring operation and decreased during regenerative operation. The sum of the rotor frequency $f_r$ of rotor 42 and the slip frequency $f_s$ of motor 22, thus equals the electrical frequency $f_e$ of the cyclical current applied to stator winding 26 by inverter 96. The separate signals in conductors 63 and 138 may be combined in a signal conductor, if desired.

Ring counter 124 distributes the firing pulses of oscillator 126 to controlled rectifiers 104, 108 and 112 in a desired sequence. The desired sequence may be as above, or it may be the reverse, i.e. controlled rectifiers 112, 108 and 104. The sequence in which the controlled rectifiers are fired determines the sequential energization of the stator coils of motor 22 and the direction of rotation of the rotating magnetic flux of motor 22, shown by the vector $I_m$ in FIG. 3. Ring counter 124 may be of the type shown on page 4—4 of *Application Memos*, published by the Signetics Corp., Sunnyvale, Calif., 1968.

Inverter 94 effects commutation by current transfer, that is, by transferring current out of one of the parallel current paths into another current path. It may be assmed that controlled rectifier 104 is in the conductive state and is supplying current 21 from output terminal 74 of power supply 66 through diode 106 to conductor 28 and stator coil 26A. It may also be assumed that capacitor 116 and capacitor 120 have been charged such that a positive potential exists on the common connection of the cathode of controlled rectifier 104, the upper plates of capacitors 116 and 120 and the anode of diode 106.

To effect the transfer of current 21, from current path 98 to current path 100, controlled rectifier 108 is fired on. When controlled rectifier 108 is fired on, the current in controlled rectifier 104 is extinguished by the voltage on capacitors 116 and 120. Controlled rectifier 104 is thus commutated off by capacitors 116 and 120. The current 21 from power supply 66 then flows through controlled rectifier 108 but remains momentarily unchanged through diode 106, capacitors 116, 118 and 120 and stator coil 26A. Current flow through capacitor 116 from controlled rectifier 108 to diode 106, discharges capacitor 116, causing its voltage to go through zero and to build up in the opposite polarity. As the voltage on capacitor 116 becomes equal to the voltage between conductors 28 and 30, diode 110 becomes unblocked and the voltage on capacitor 116 is applied to stator coils 26A and 26B. This initiates current flow in conductor 30 and stator coill 26B and commences the transfer of current from stator coil 26A to 26B. The transfer of current from stator coil 26A to 26B of motor 22 proceeds at an increasing rate as the voltage on capacitor 116 continues to build up due to the stator coil 26A current still flowing through it. Finally, the complete current 21 from power supply 66 is transferred or commutated into stator coil 26B, leaving capacitor 116 charged with a very substantial negative potential at the upper plate and a corresponding positive potential at the lower plate, due to the leakage reactance stator winding 26 of the motor 22.

During the above described commutation, at the same time current is flowing through capacitor 116, current is also flowing serially through capacitor 118 and capacitor 120 so that at the completin of the commutation, capacitor 118 has been charged with its upper plate positive and its lower plate negative. This charge and the charges on capacitors 116 and 120 are retained on the capacitors by the blocking, or isolating, action of the associated diodes.

When controlled rectifier 112 is fired on capacitors 116 and 118 effect the turn off and controlled rectifier 108 and the commutation of current from stator coil 26B to 26C in a manner similar to that described above. When controlled rectifier 104 is fired capacitors 118 and 120 effect the turn off of controlled rectifier 112 and the commutation of current 21 from stator coil 26C to 26A.

The operation of motor control 20 to produce the operative condition in induction motor 22 shown in FIGS. 3, 4 and 6 will now be explained. As noted above, FIG. 3 shows the no output torque operating state of motor 22 in which rotor 42 is rotating in synchronism with vector $I_m$ of motor 22 driven, for example, by the inertia of load 48. In the no torque operating state, no output torque is being requested of motor 22 and no torque command signal from potentiometer 60 will appear in conductors 61 and 63 or will be applied to function generator 94 and oscillator 126. The signal in conductor 138 from tachometer generator 137 causes oscillator 126 to generate pulses at a frequency corresponding to the rotor frequency of motor 22 so that no slip frequency appears in motor 22.

Function generator 94 will provide an output signal in conductor 82 to firing circuit 80 calling for a current 21 from power supply 66 and a stator current $I_s$ to motor 22 having a per unit value of 1. This is in accordance with the graph of FIG. 9 which indicates that for the no output torque condition of motor 22 the stator current $I_s$ must have a per unit value of 1. The exciting current $I_m$ is co-equal with the stator current $I_s$ and also has a per unit value of 1.

Inverter 96 periodically and sequentially applies current 21 to stator coils 26A, 26B and 26C as stator current $I_s$ at a frequency corresponding to the rotor frequency. For purposes of analysis, the fundamental component of the square wave pulses may be assumed to be applied. The fundamental currents generate the rotating magnetic flux of motor 22. No fundamental rotor current $I_r$ is induced in rotor conductors 44 so that the above described energization of motor 22 by motor control 20 produces the operating conditions shown in FIG. 3.

It may now be assumed that potentiometer 60 is adjusted to provide a torque command signal to motor control 20 and, more specifically, a torque command signal calling for a motoring output torque condition of motor 22 of rated torque. This is an output torque having a per unit value of 1. A torque command signal appears in conductor 61 to function generator 94. For purposes of illustration it may be assumed that for motoring torques a positive voltage signal appears in conductor 61. In accordance with the operation of function generator 94, as shown graphically in FIG. 9, function generator 94 provides a current reference signal in conductor 82, calling for a stator current having a per unit value of 2.7 and current regulated power supply 66 provides a direct current 21 having such a magnitude.

The torque command signal in conductor 63 is supplied to oscillator 126 to raise the pulse generation rate of oscillator 126. The rate of pulse generation and the speed of rotation of the motor magnetic flux is increased by an amount which will generate the desired slip frequency in motor 22, the speed of rotor 42 remaining instantaneously the same. As shown by the graph of FIG. 9, the increase in the rate of pulse generation oscillator 126 must be such as to generate a slip frequency in rotor 42 of 2.3 Hertz. Since the relationship between the motor torque i.e. the torque command signal, and slip frequency is linear, as shown by the fact that both quantities are plotted on the abscissa of the graph of FIG. 9, no function generator need be interposed between potentiometer 60 and inverter 96.

With a slip frequency now appearing in rotor 42, a rotor current will be generated in the rotor and an output torque will be generated by motor 22 as the exciting current $I_m$ and rotor current $I_r$ subtend the angular displacement with respect to the stator current $I_s$ which establishes the vector relationship necessary to both maintain the exciting current $I_m$ constant and offset the effect of the rotor current $I_r$. When the necessary angular displacement is achieved, the rated torque having a per unit value of 1 is provided from motor 22. The application of a per unit stator current $I_s$ of 2.7 insures that the exciting current $I_m$ remains constant.

When the torque command signal is adjusted to provide other output torque conditions, an analogous operation of motor control 20 occurs. For example, when potentiometer 60 is altered to increase the torque command signal to request an output torque condition having a per unit value of 2, the signal in conductor 61 causes function generator 94 and current regulated power supply 66 to provide a current 21 having a per unit value of approximately 5. The signal in conductor 63 causes oscillator 126 and inverter 96 to generate slip frequency of 4.7 Hertz in motor 22, resulting in the production of twice the rate torque when the appropriate displacement angle $\theta$ has been displaced in motor 22.

Operation of motor control 20 in the regenerative mode to produce a retarding torque on rotor 42 is also accomplished in a maner analogous to that described above. To proceed from the no torque condition shown in FIG. 3 to the application of a retarding torque equal to the rated torque of motor 22, potentiometer 60 is manipulated to provide a negative voltage signal in conductors 61 and 63. The signal so generated in conductor 61 causes function generator 94 to again generate a current 21 having a per unit value of 2.7 since, as shown in the graph of FIG. 9, the same magnitude of input signal in conductor 61 will produce the same value of current value 21 regardless of the polarity of the signal from potentiometer 60.

However, the torque command signal in conductor 63 causes oscillator 126 to reduce the rate of pulse generation and the speed of rotation of the motor magnetic flux. This causes a slip frequency to appear in motor 22. However, the direction of rotation of rotor 42 relative to rotating magnetic flux is opposite from that appearing under motoring conditions since the rotor is rotating faster than the magnetic flux rather than slower. The rate of pulse generation of oscillator is reduced so that a slip frequency of 2.3 Hertz appears in motor 22. The application of a per unit stator current $I_s$ of 2.7 and a slip frequency of 2.3 Hertz causes rated torque to again be generated in motor 22 when the appropriate angular relationship between the rotor current $I_r$, the exciting current $I_m$ and the stator current $I_s$ is formed. However, because of the reversal of the direction of relative rotation between the motor magnetic field and rotor 42, the torque is a retarding torque, rather than an accelerating torque, so that motor 22 acts as an electrical source rather than as an electric load and braking of rotor 42 occurs.

The current regulating circuitry of power supply 66 operates to automatically maintain current 21 at the desired level regardless of the voltage of inverter 96, and will provide from power supply 66 a voltage of the magnitude and polarity necessary to so maintain the current. Under conditions in which the voltage at the terminals of inverter 96 has reversed, the current regulating circuitry of power supply 66 will cause the voltage of the power supply to reverse so that the power supply becomes an electrical load for motor 22 as a source. This effects regenerative operation.

Figure 10:
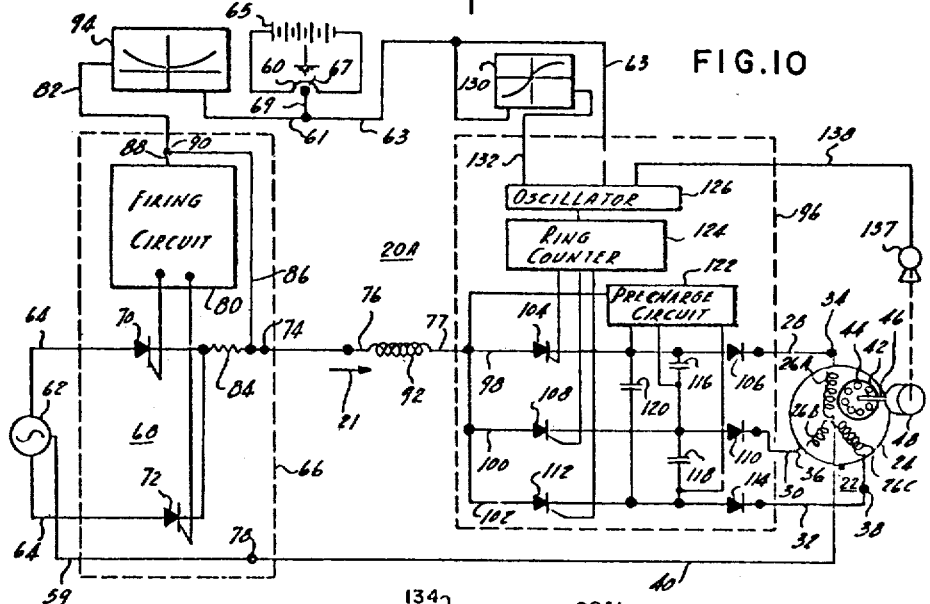
FIG. 10 is a schematic diagram of another embodiment of the self excited alternating current motor torque control.

Improved operation of motor control 20 may be obtained by including an additional function generator, a shown in motor control 20A of FIG. 10. The additional function generator 130 is interposed between potentiometer 60 and oscillator 126 and provides a signal in conductor 132 to the latter element which controls the time of generation of the firing pulses by oscillator 126 but does not alter the rate of generation of firing pulses. This may be accomplished by varying the charge on the oscillator capacitor. The signal in conductor 132 thus serves to advance or retard the generation of the firing pulses to inverter 96.

The input signal to function generator 130 is the torque command signal in conductor 63 and the function obtained in function generator 130 is that of relating the magnitude of the torque command input signal to the amount by which the firing pulses of oscillator 126 are advanced or retarded by the output signal of function generator 130. The purpose for so doing is to effect a change in the position of the vector $I_s$, with respect to its no torque position, i.e. with respect to vector $I_m$, as shown in FIG. 6, as a function of the torque command input signal. The function of function generator 130 is thus that of the angular displacement $\theta$ which function is displayed by plot 52 on the graph of FIG. 9 for both motoring and regenerative operation and in the block in FIG. 10 schematically representing function generator 130.

The signal in conductor 63 is also supplied directly to oscillator 126 so as to vary the rate of pulse generation of oscillator 126 in the manner described in connection with FIG. 1.

The operation of motor control 20A in the no torque condition in which rotor 42 is rotating synchronously with the rotating magnetic flux of motor 22 is the same as that described in connection with motor control 20 of FIG. 1. Since there is no torque command signal in conductor 63, there is no signal in conductor 63 which would alter the rate of pulse generation of oscillator 126. The absence of an input signal to function generator 130 prevents the generation of an output signal in conductor 132 which would advance or retard the application of the firing pulses of oscillator 126 to inverter 96.

When potentiometer 60 is adjusted to provide a torque command signal to motor control 20A for the rated output torque condition in the motoring direction, the operation of function generator 94 and current regulated power supply 66 is the same as described above to supply current 21 and stator current $I_s$ having a per unit value of 2.7. The torque command signal in conductor 63 is applied to oscillator 126 to raise the rate of pulse generation of pulse generator 126 and the slip frequency in rotor 42 to 2.3 Hertz. As noted above, the energization of motor 22 will effect the generation of the rated output torque condition in motor 22 when the desired vector relationship is formed by the operation of motor 22.

This time delay is avoided in motor control 20A by the inclusion of function generator 130 which, responsive to a torque command signal in conductor 63, immediately advances the generation of firing pulses of oscillator 126, the application of current pulses to stator coils 26A, 26B and 26C, and the angular displacement of the stator current $I_s$ so that the desired angular displacement of vector $I_s$ from the no torque position is immediately obtained in motor 22. This results in rated motor torque likewise being instantaneously generated.

Figure 11:
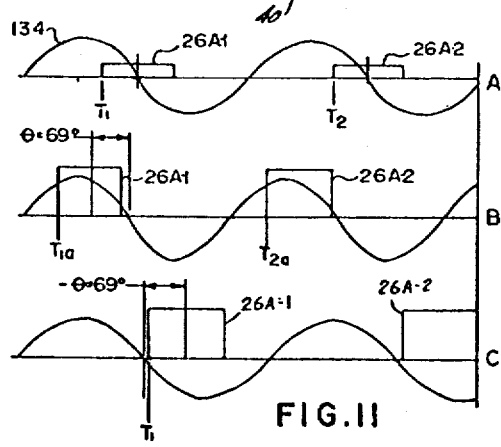
FIG. 11 is a wave form graph showing the CEMF of an induction alternating current motor and the current energization of the stator winding thereof.

The above described phase displacement of the stator current $I_s$ by altering the phase displacement of the current pulses applied to stator winding 26 by inverter 96 may be further seen by reference to FIG. 11.

FIG. 11 utilizes the CEMF across one of the stator coils as the reference for the advancement and retardation of the stator current pulses. FIG. 11A shows the no torque condition of motor 22 with which the previous discussions of its operation have been initiated and shows the CEMF developed across stator coil 26A of stator winding 26 by means of wave form 134. CEMF 134 is generated by conductors of stator coil 26A cutting the magnetic flux $I_m$ of motor 22 at frequency $f_e$. CEMF 134 generated in the stator coil is sinusoidal, being the conventional internally generated voltage of a rotating electromagnetic machine. The frequency of CEMF 134 is $f_e$. Because of the reactive impedance of the mutual reactance $X_m$, the exciting current $I_m$ is 90° out of phase with voltage 134.

In the no torque condition of motor 22, there is no phase displacement $\theta$ of the stator current $I_s$ from the no torque position and no phase displacement between vector $I_s$ and vector $I_m$, as shown in FIG. 3. Thus, the stator current pulses must also be applied 90° out of phase with CEMF 134, as shown in FIG. 11A. While to simplify the explanation, the stator current pulses are shown as square waves, it must be understood that in actuality the fundamental component of the stator current is applied as described herein. Stator current pulses 26A-1 and 26A-2 are shown as having a per unit value of 1. The zero power state of motor 22 shown in FIG. 11A is commensurate with its no torque state. Stator current pulses 26A-1 and 26A-2 may be applied at times $T_1$ and $T_2$ to effect the zero power and no torque condition described above.

Rated motoring torque, may be provided by increasing the stator current to a per unit magnitude of 2.7, increasing the frequency of the stator current pulses and thereby the slip frequency of motor 22 by 2.3 Hertz, and advancing the application of the stator current pulses 69°. A corresponding phase displacement of the stator current $I_s$ from the no torque position is thus obtained. This operation is described in connection with FIG. 11B. As shown therein, the magnitude of the stator current $I_s$ has been increased 2.7 times, as shown by the relative height of the current pulses. The frequency of CEMF 134 has been increased, due to the increased frequency of the applied stator current pulses necessary to generate the required slip frequency in motor 22. The interval of the current pulses has been correspondingly shortened.

More importantly, the position of stator current pulses 26A-1 and 26A-2 with respect to CEMF 134 has been advanced, as shown in FIG. 11B, with respect to the no torque position shown in FIG. 11B. The pulses are applied at times $T_{1a}$ and $T_{2a}$. The amount of the advance corresponds to the phase displacement $\theta$ of the stator current $I_s$ from the no torque position and is identified as such in FIG. 11B. As the stator current $I_s$ is substantially in phase with the CEMF, power is now drawn from motor control 20A by motor 22 to provide a motor output torque condition equal to rated motor torque.

In an analogous manner, FIG. 11 C shows the generation of rated torque in the braking or decelerating mode. The stator current pulses are again increased to a per unit value of 2.7. The frequency of application of the current pulses is decreased to produce a slip frequency in motor 22 of 2.3 Hertz. The application of the stator current pulses 26A-1 and a6A-2 with respect to CEMF 134 has been retarded by applying them at times $T_{1b}$ and $T_{2b}$. The amount of retardation corresponds to the phase displacement $\theta$ of the stator current vector $I_s$ from the no torque position and is identified as $-\theta$ in FIG. 12C. Since the stator current is substantially in phase with the opposite polarity of CEMF, power is returned to motor control 20A from motor 22 to obtain a braking torque equal to rated torque.

The following paragraphs deal with the speed control of self excited alternating current motors. By virtue of the precise control of the motor output torque condition obtainable by the motor control of the present invention, the speed of the motor may also be controlled in both the motoring and regenerative operating modes. This control of speed is obtained by making the torque command signal proportional to a speed error signal. For this purpose a speed feedback signal is provided from the motor as typically shown in motor control 20C of FIG. 12. In the case of an induction motor 22, the rotor frequency signal in conductor 138 may conveniently be made to function as a speed feedback signal or a separate speed feedback signal may be developed in conductor 154. The signal in conductor 154 is applied to summing junction 156 where it is compared with a speed reference signal in conductor 158 generated by wiper 160 of potentiometer 162 energized by battery 164. A speed error signal is thus produced in conductor 166 which may be utilized as the torque command signal.

The speed error signal in conductor 166 may be amplified by amplifier 168, the gain of which determines the accuracy of speed regulation. The error signal is applied to limit circuit 170 for limiting the magnitude of the error signal to obtain important control features, hereinafter described. Limit circuit 170 may include a breakover diode means for limiting the magnitude of the error signal. The output signal of limit circuit 170 in conductor 69 is provided as the input signal to function generator 94 and to inverter 96.

In operation, potentiometer 162 is adjusted to provide, at wiper 160 and in conductor 158, a speed reference signal corresponding to the desired speed of motor 22. Tachometer generator 137 provides, in conductor 154, a signal proportional to the actual speed of rotor 42 of induction motor 22 controlled by motor control 20C. The difference between the signals in conductors 154 and 158 is determined at summing junction 156 and a speed error signal is provided therefrom in conductor 166.

The speed error signal in conductor 166 is applied through amplifier 168 and limit circuitry 170 to conductor 69 to operate function generator 94 and power supply 66 in the same manner as the input signals used in motor controls 20A and 20B, described above, to provide a direct current of the required magnitude from power supply 66. The speed error signal in conductro 69 is also applied to oscillator 126 to alter the frequency of the electrical energization of stator winding 26 established by the signal in conductor 138 by an amount which will establish the necessary slip frequency in motor 22. The concurrence of the required magnitude of stator current and the necessary slip frequency will provide an output torque condition in motor 22 tending to reduce the speed error.

The torque output condition of motor 22 is controlled by the above described circuitry so that the motor output torque, as determined by the current and slip frequency energization of motor 22, acts to maintain the speed of motor 22 at the level desired by the setting of potentiometer 162. Thus, under motoring conditions, if the speed of rotor 42 should fall from the regulated value, the signal in conductor 154 will decrease. An increased speed error signal will appear in conductors 166 and 69 due to the summation occurring at summing junction 156 between the signal in conductor 154 and the signal in conductor 158. The increased signal in conductor 69 will cause power supply 66 to increase current 21. The signal in conductor 63 to oscillator 126 will cause the latter to increase the rotor slip frequency which, along with the increased current 21, increases the output torque of motor 22 to restore the speed of rotor 42 to the regulated value. Similar, but opposite, operation occurs when the rotor speed increases over the regulated value and analogous operation occurs during regenerative operation of motor 22.

In the event of an excessive speed error signal, limit circuit 170 limits the magnitude of the signal in conductor 69. This limiting operation limits the maximum output torque of motor 22 and maintains this maximum output torque for the duration of the excessive speed error signal condition. It is important to note that it is the signal in conductor 69 that is subjected to the limiting action. This insures that the operation of power supply 66 and inverter 96 are simultaneously and coordinately controlled under limit conditions thereby to maintain the maximum output torque. Limiting the maximum magnitude of the stator current prevents excessive current conditions in the motor and control. However, unless the slip frequency is also simultaneously and correspondingly limited a precipituous decrease in torque will occur as the slip frequency rises. This undesirable degenerative condition is avoided and high torque is maintained by placing the limit on the signal in conductor 69, thereby maintaining the desired relationship between stator current and motor slip frequency. While the use of a single limit circuit 170 has been found to be most desirable for use in motor control 20C, it will be appreciated that separate limit circuits may be used to limit slip frequency and stator current, if desired. The operation of such separate limit circuits must be coordinated in order to maintain the necessary simultaneousness in limiting action.

Figure 12:
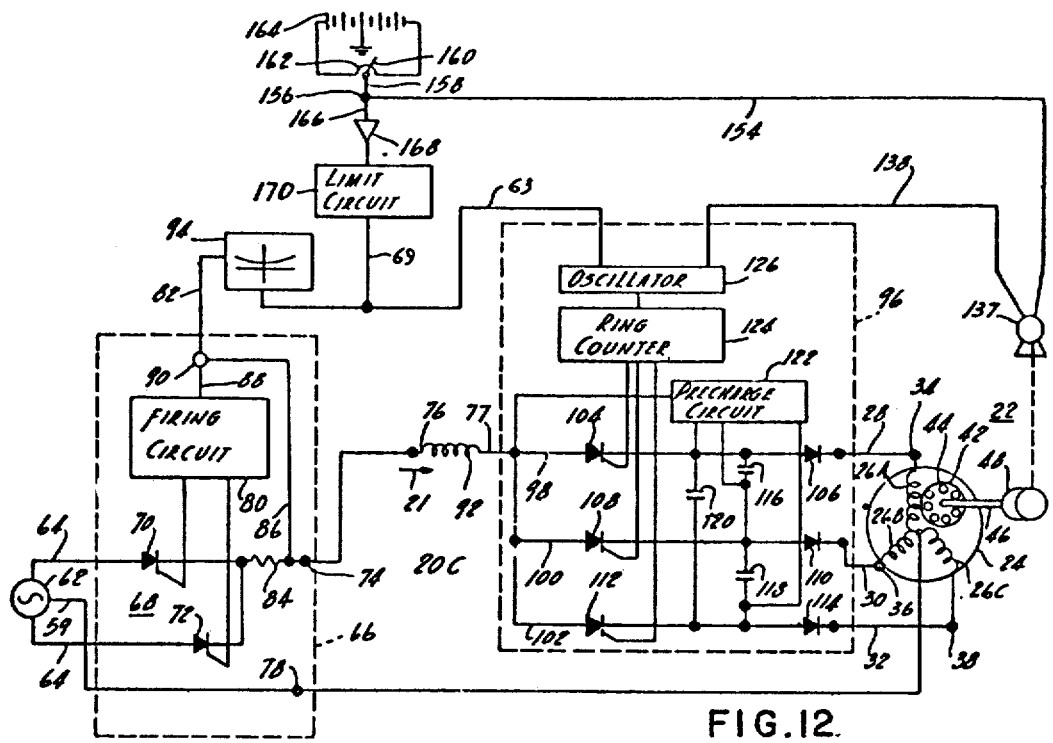
FIG. 12 is a schematic diagram of an embodiment of the torque control suitable for controlling the speed of an induction motor in accordance with the method of the present invention.
Figure 13:
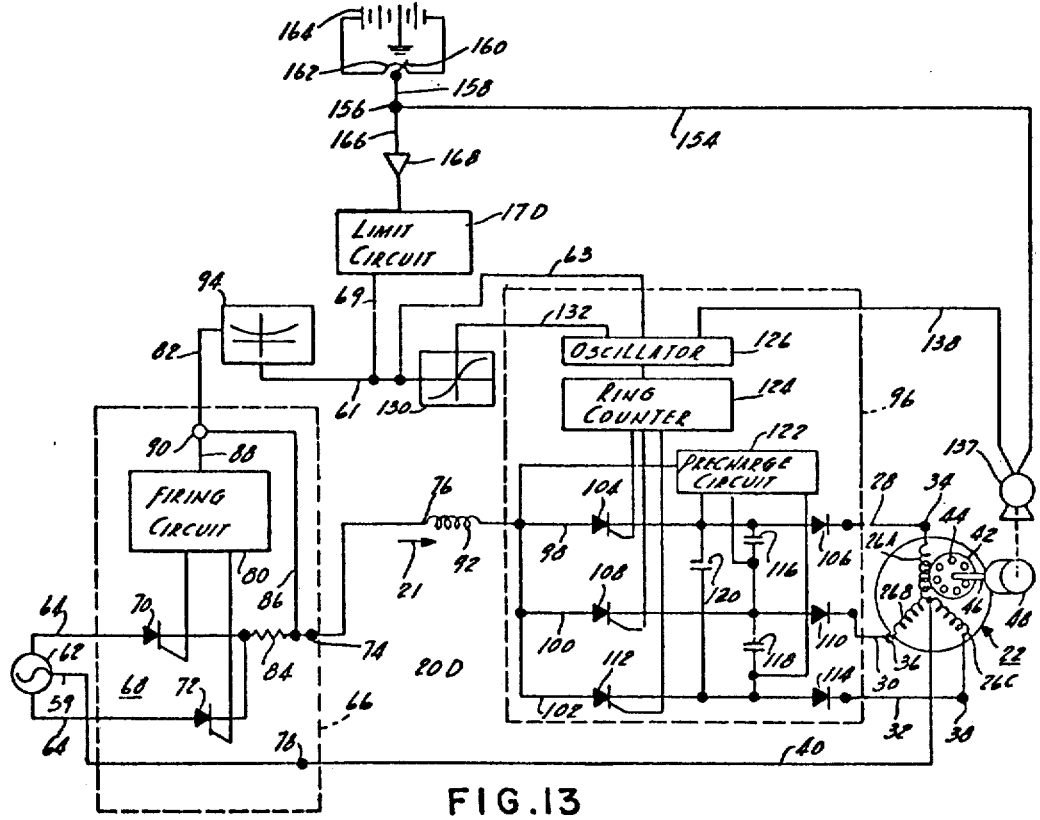
FIG. 13 is a schematic diagram of a modification of the induction motor speed control shown in FIG. 16.

In FIG. 13, a control 20D similar to that shown in FIG. 12 is illustrated. Motor control 20D contains function generator 130 which controls the amount of advancement or retardation of the firing pulses of oscillator 126 and the corresponding phase displacement of the current energization of stator winding 26. The output signal of limit circuit 170 in conductor 69, is provided to the input of function generator 130 for this purpose. The operation of motor control 20D of FIG. 13 resembles the operation of the motor control 20A of FIG. 10 in that both function generators 94 and 130 are operated by the signal in conductor 69.

Figure 14:
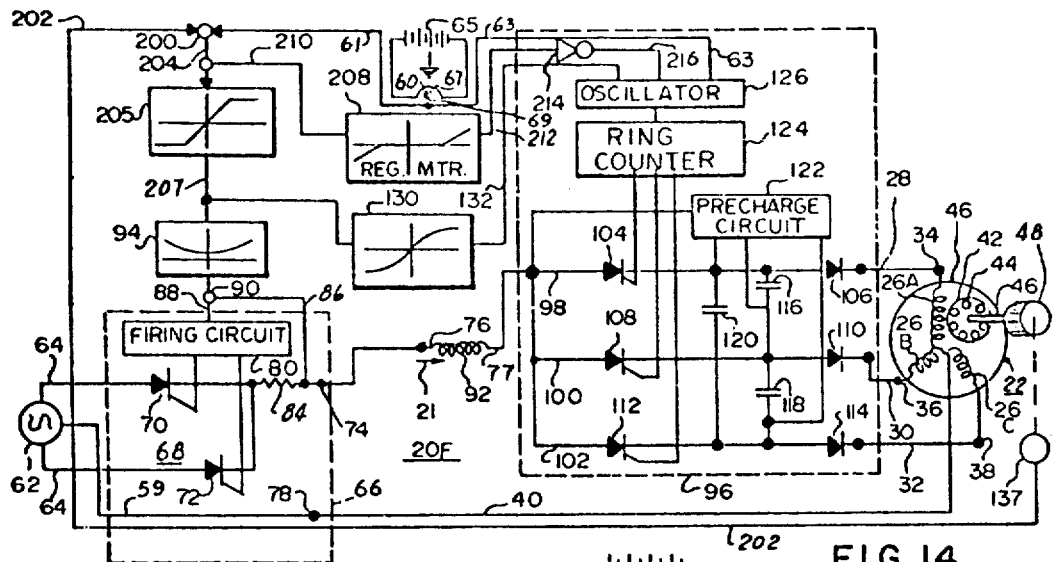
FIG. 14 is a schematic diagram of another embodiment of the torque control.

FIG. 14 shows a motor control 20F which permits energization of the stator winding of the motor with a cyclical current of a fixed frequency under normal operating conditions while additionally providing as many advantages of the improved motor control of the present invention as are commensurate with fixed frequency operation.

In the motor control 20F of FIG. 14, the oscillator input signal in conductors 69 and 63 from wiper 67 of potentiometer 60 causes the oscillator to operate inverter 96 so as to energize stator winding 26 with a cyclical current having a frequency $f_e$ proportional to the signal in conductor 63. Thus, in motor control 20F, the signal in conductors 69 and 63 corresponds to the stator winding frequency $f_e$ and the synchronous speed of motor 22, rather than the slip frequency $f_s$ and the output torque condition as is the case in motor controls 20 and 20A in FIGS. 1 and 10, respectively.

In motor control 20F, the rotor frequency signal in conductor 138 is not provided to oscillator 126, but rather is provided in conductor 202 to summing junction 200. The signal in conductor 61 from wiper 67 is also provided to summing junction 200 so that the summing junction provides a difference signal in conductor 204 proportional to the difference between the two input signals. As noted above, the signal in conductor 69 corresponds to the stator winding frequency $f_e$ so that the signal in conductor 61 likewise corresponds to the electrical frequency $f_e$ of stator winding 26. Since the signal in conductor 61 corresponds to electrical frequency $f_e$ and the signal in conductor 202 is proportional to rotor frequency $f_r$, the difference signal in conductor 204 is proportional to slip frequency $f_s$.

The slip frequency signal in conductor 204 may be used as the input to function generator 94 in the same manner as the torque command signal of motor controls 20 and 20A of FIGS. 1 and 10 as it will be recalled that the torque command signal in motor controls 20 and 20A is also proportional to slip frequency. The slip frequency signal in conductor 204 may be passed through limit circuit 205 which limits the magnitude of the input signal in conductor 207 applied to function generator 94 and the stator current of motor 22. This occurs during limit conditions hereinafter described.

The signal in conductor 207 may also be used as the input signal to function generator 130 to advance or retard the firing pulses of oscillator 126 to obtain phase displacement of the stator current. If the advantages obtained by the inclusion of function generator 130 are not needed or desired, this function generator may be eliminated from motor control 20F.

The operation of motor control 20F may be initially analyzed by considering operation of motor 22 in the no torque condition. It may be assumed that the wiper 67 of potentiometer 60 is adjusted to provide a signal in conductors 61 and 63 proportional to the desired frequency of cyclical current energization $f_e$ of stator winding 26 to provide a rotating magnetic flux in motor 22. Rotor 42 rotates at the same speed as the rotating magnetic flux. Tachometer generator 137 provides a signal in conductor 202 to summing junction 200 corresponding to the rotary frequency $f_r$ of rotor 42 which, in the no torque condition, is equal to the stator frequency signal $f_e$ in conductor 61. No slip frequency signal is developed in conductor 204. Function generator 94 causes power supply 66 to provide an exciting current to motor 22.

When a load is applied to the output shaft 26 of motor 22, the rotor 42 slows from its no torque speed condition. Tachometer generator 137 provides a signal in conductor 202 to summing junction 200 corresponding to the rotor frequency $f_r$ of rotor 42. Since the rotary frequency is now less than the stator frequency $f_e$, due to the slowing of rotor 42, a signal proportional to slip frequency $f_s$ is developed in motor control 20F. The slip frequency signal in conductor 204 passes without limiting action through limit circuit 205 and the slip frequency signal in conductor 207 is provided to function generator 94 for causing power supply 66 to provide a stator current commensurate with the slip frequency condition of the motor. A motor output torque condition is developed for driving the load of motor 22.

The motor control 20F of FIG. 14 uses the inherent slip characteristics of the motor to generate the desired slip frequency when a load is applied to the motor. However, motor control 20F maintains the necessary relationship between the stator current factors and the slip frequency, as the load is applied, so that efficient operation of motor 22 is retained. As there is an absence of a speed control loop in motor control 20F, the operation of motor control is inherently more stable, although the accuracy of speed regulation is lessened. Further, as tachometer generator 137 is not connected to oscillator 126, the inevitable noise in the tachometer generator output signal is kept out of oscillator 126 and inverter 96 resulting in extremely smooth operation.

When the position of wiper 67 of potentiometer 60 is altered, the signals in conductors 61 and 63 are altered. The alteration of the signal in conductor 63 alters the difference signal in conductor 204 from summing junction 200. The alteration of the signal in conductor 204 causes a corresponding alteration in the current output of power supply 66 and the stator current of motor 22. Simultaneously, the altered signal in conductor 63 changes the stator frequency $f_e$ applied to stator winding 26 of motor 22. The result of this abrupt change in the signal in conductors 69, 61 and 63 is the production of a corresponding change in the output torque condition of motor 22. This abrupt output torque change is made possible by the inertia of rotor 42, and the load on output shaft 46 which prevent abrupt change in rotor frequency. Assuming a constant torque load on output shaft 46, the change in the output torque condition of motor 22 produces acceleration in a direction to cause the shaft speed to follow the change in stator frequency $f_e$.

It is usually desirable to restrict the maximum output torque of motor 22 to a preselected limit, such as 150% of rated torque. Attainment of the torque limit condition is sensed by sensing the corresponding maximum slip frequency signal in conductor 204.

For the foregoing purpose, limit circuit 205 is adjusted so that the output of the limit circuit is clamped, i.e. remains at a fixed level, when the maximum slip frequency is obtained. A second limit circuit 208 is incorporated in motor control 20F. Limit circuit 208 is connected to conductor 204 by conductor 210 and is constructed so as to spill over or provide an output signal in conductor 212 corresponding to the amount by which slip frequency exceeds the desired maximum value.

The output signal of limit circuit 208 in conductor 210 is inverted and may be amplified by inverting amplifier 214. The output of amplifier 214 is provided in conductor 216 to oscillator 126 for altering the frequency of the cyclical current energization $f_e$ applied to stator winding 26. Precise slip frequency limitation may be obtained by incorporating in amplifier 214 integration circuitry which maintains desired slip frequency under large, out of range speed conditions.

In operation, when the output torque condition and slip frequency of motor 22 exceed the preselected values in the motoring mode, as for example by excessive slowing of rotor 42, limit circuit 205 acts to limit the stator current to a value corresponding to the preselected value of output torque. Limit circuit 208 provides an output signal in conductor 210 corresponding to the excessive slip frequency in motor 22. The signal in conductor 210 is inverted by inverting amplifier 214 and applied to oscillator 126 to reduce the frequency of the cyclical current $f_e$ applied to stator winding 26 thereby maintaining the slip frequency and output torque at the preselected values.

In the regenerative mode of operation, when rotor 42 is, for example, rotating excessively fast, the signal in conductor 216 causes oscillator 126 to increase the frequency of the cyclical current $f_e$ applied to stator winding 26 to similarly retain the slip frequency and output torque of motor 22 at the preselected values. Limit circuit 205 again acts to limit the stator current to a value corresponding to the preselected value of output torque.

It is important to note that the operation of power supply 66 and inverter 96, and hence the stator current and slip frequency, are simultaneously and coordinately controlled in the limit condition, thereby to maintain the maximum output torque of motor 22. This maximum output torque condition is obtained for all operating states of motor 22 outside normal operating conditions and provides maximum torque per ampere operation to motor 22 at all speeds thereof including zero.

Limit ciruits 205 and 208 may incorporate breakover diodes to obtain the limiting functions. If limit circuit 208 is of the type which maintains a signal clamp at its input, the clamping action thus provided to conductor 204 may be used in lieu of a separate limit circuit 205 interposed in the conductor between summing juction 200 and function generator 94. Further, since slip frequency is limited by the action of limit circuit 208, the slip frequency signal in conductor 204 is correspondingly subject to a limiting action. This signal in conductor 204, limited in this manner may be applied to function generator 94 to limit the stator current to motor 22.

While motor control 20 has been shown as having a power supply means 66 suitable for energization by single phase alternating current power mains 64, it will be appreciated that numerous other types of AC to DC conversion apparatus may be employed in power supply means 66. For example, a single phase rectifier bridge may be employed in the power supply means. Where power mains 64 provide polyphase alternating current, the power supply means may incorporate polyphase conversion apparatus, such as a polyphase rectifier bridge. In applications in which regenerative operation of motor 22 is not desired or required, so that a negative voltage need not be developed in the power supply means, such a polyphase rectifier bridge may consist of complementary rectifier and diode banks.

Figure 15:
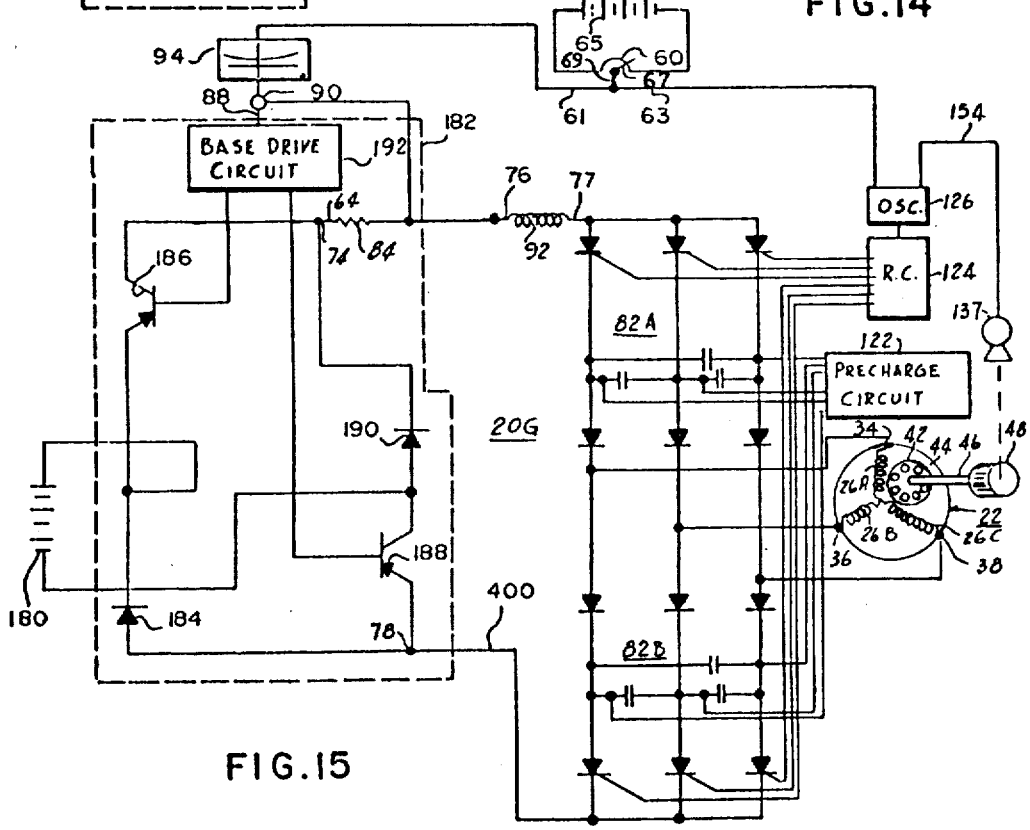
FIG. 15 is a schematic diagram of yet another modification of the torque control.

While motor control 20 has heretofore been shown as energized from alternating current power mains 64, the motor control may also be operated from direct current mains. In FIG. 15, the direct current power mains are diagrammatically shown as the positive and negative terminals of battery 180. The adjustable magnitude current 21 may be obtained from the constant output voltage of battery 180 by incorporating a chopper in power supply 66. As its name implies, a chopper provides an adjustable magnitude direct current voltage by repetitiously applying the constant voltage of battery 180 for adjustable time intervals so that over a period of time the average value of direct current is at the desired level. A simple chopper suitable for use in the motor control of the present invention is further described in the *RCA Transistor, Thyristor, and Diode Manual* published in 1969 at page 146.

Where regenerative operation is required, and the electrical energy source for the motor control of the present invention is a fixed voltage direct current source, conventional DC to DC conversion circuitry will not suffice. To achieve regenerative operation from a fixed voltage direct current source, the chopper 182 shown in FIG. 20 is utilized. Chopper 182 includes two series connected transistor and diode pairs connected between conductors 76 and 400. Specifically, the anode of diode 184 is connected to conductor 400. The cathode 184 is connected to the emitter-collector circuit of transistor 186 which, in turn, is connected to conductor 76. The emitter-collector circuit of transistor 188 is connected to conductor 400 and to the anode of diode 190, the cathode of which is connected to conductor 76. The base terminals of transistors 186 and 188 are connected to base drive circuit 192 which controls the turn on and turn off of transistors 186 and 188.

Base drive circuit 192 may turn on both transistor 186 and 188 simultaneously for predetermined time intervals. A direct current path is provided from battery 180, as an electrical source, through transistor 186 to conductor 76 and the remaining portions of motor control 20G and from conductor 400 through transistor 188 back to battery 180.

During the off time of transistors 180 and 188, a current path exists from conductor 400 through diode 184, battery 180, as an electrical load, diode 190, to conductor 76 and the remaining portions of motor control 20G.

In another mode of operation, the on-off control of transistors 186 and 188 may be provided such that both transistors are operated alternately. For example, it may be initially assumed that transistors 186 and 180 are both on, providing a chopper output voltage. The current path through chopper 182 is as described above from battery 180 to transistor 186 to conductor 76 and from conductor 400 through transistor 188 to battery 180. When transistor 188 is turned off, battery 180 is removed from the circuit and the supply of voltage is terminated. The current 21 of motor control 20G flows from conductor 400 through diode 184, transistor 186, directly to conductor 76 bypassing battery 180 and preventing undue electrical strain thereon. Later, transistor 188 is turned back on and the supply of voltage is resumed. Still later, transistor 186 is turned off, switching battery 180 out of the circuit and terminating the supply of output voltage. The current 21 of power supply then flows from conductor 400 through transistor 188 and diode 190 directly to conductor 76. When transistor 186 is turned back on the voltage reappears at the output of chopper 182. The above operation is continued to supply an average output voltage level to the remaining portions of the motor control.

The magnitude of the average output voltage level of chopper 182 is determined by the conductive intervals of transistors 186 and 188 and more specifically, by the time intervals during which transistors 186 and 188 are simultaneously on. The shorter the period of simultaneous conduction, the lower the average output voltage level.

During regenerative operation, both transistors 186 and 188 are simultaneously off for all or a portion of the time. The current 21 in conductor 400 flows through diode 184, battery 180, as an electrical load and diode 190 to conductor 76, providing the desired regenerative action. This regenerative action may be relieved to any desired extent commensurate with proper regulation of the power supply current by alternately turning on transistors 186 and 188 to remove battery 182 from the path of current flow.

FIG. 15 also shows in schemtic form a frequency control means of the full-wave configuration in the motor control 20G. This frequency control means is identified as the series connection of the two half-wave inverters 82A and 82B. Inverter 82A is identical to the inverter shown in FIG. 1 while inverter 82B operates in an identical manner but has the polarity of all semiconductor devices reversed. The series connection is made at the three alternating current terminals of the two inverters with the motor supply lines 28, 30 and 32 also connected individually to these terminals. Operation of inverters 82A and 82B is coordinated to make symmetrical the flow of current 21 into and out of each of stator coils 26A, 26B and 26C. The RMS current in the stator coils is thereby reduced. The average or direct current component is eliminated and neutral conductor 40 is eliminated. Also the pulsations in motor torque are reduced and the ripple voltage applied to inductor 92 is reduced.

The benefits of phase multiplication illustrated by the full-wave configuration shown in FIG. 15 may be extended further by techniques commonly used in polyphase rectifier circuitry. For this purpose, the stator winding 26 may be arranged in two or more isolated groups wherein each group is made up of stator coils such as 26A, 26B and 26C in a symmetrical arrangement. Each group may then be connected to its own inverter with the operation of the individual inverter being coordinated to apply current to each coil at the desired time.

Where two or more inverters are employed, their connection to the power supply means may be either serial or parallel. In the series connection the current 21 is identically the same in all inverters. In the parallel connection an individual inductor may be provided with each inverter to maintain the desired smoothness of direct current in the individual inverters. Alternatively a separate power supply means may be provided with each inverter in which case all power supply means are made responsive to the same current reference signal.

Phase shifting transformers may be interposed between the inverter and the motor to achieve the benefits of multiphase operation without requiring special grouping of the coils in stator winding 26.

I claim:

1. The method of producing a desired torque condition in an induction motor having a stator winding producing a motor flux controllable to a desired level by the magnitude of a stator current having a frequency characteristic, said motor also including a rotor the rotary condition of which is definable in terms of a rotor frequency which is referenced to the stator winding, and said motor being capable of having a slip frequency therein equal to the algebraic summation of the rotor frequency and the stator current frequency, said method comprising the steps of:
   a. providing an adjustable stator current for the motor;
   b. sensing the existing rotor frequency of the rotor;
   c. establishing the slip frequency of the motor at a value proportional to the desired motor torque condition by altering at least one of the stator current frequency and the rotor frequency;
   d. concurrently establishing the magnitude of the stator current responsive to the sensed rotor frequency to a value prescribed solely as a predetermined function of the desired motor torque condition; and
   e. concurrently establishing the phase displacement of the stator current, wherein the stator winding is energized by the stator current phase displaceable with respect to a flux producing exciting current, at a value prescribed solely as a predetermined function of the desired motor torque condition, the concurrent predetermined establishment of the stator current magnitude and phase displacement values establishes the motor flux at a desired level while generating the desired torque condition in the motor.

2. The method of claim 1 further defined as a method for changing the condition of the motor from an existing torque condition to a newly desired torque condition, the method being further defined as including the steps of reestablishing the slip frequency of the motor in proportion with the newly desired torque condition and concurrently therewith reestablishing the magnitude of the stator current at a new value prescribed solely as a predetermined function of the newly desired torque condition and which tends to retain the motor flux at the desired level while generating the newly desired torque condition in the motor.

3. The method of claim 2 further defined as a method for producing changes in the condition of the motor from an existing torque condition to a newly desired torque condition while avoiding undesirable transient conditions in the motor, said stator winding being energized by a phase displaceable stator current, said method further including the step of reestablishing the phase displacement of the stator current at a new value concurrently with the reestablishment of slip frequency and stator current magnitude, the reestablishment value of the stator current phase displacement being described solely as a predetermined function of the newly desired motor torque condition, and being such as to tend to retain the motor flux at a desired level while generating the newly desired torque condition in the motor.

4. The method of claim 3 wherein the stator winding is energized by a stator current, phase displaceable with respect to a flux producing exciting current, said method being further defined as including the step of reestablishing the phase displacement of the stator current with respect to the exciting current.

5. The method of claim 2 wherein the step of reestablishing the slip frequency is further defined as altering the frequency of the stator current by the amount necessary to reestablish the slip frequency of the motor in proportion to the newly desired torque condition.

6. The method of claim 4 wherein the step of reestablishing the slip frequency is further defined as altering the frequency of the stator current by the amount necessary to reestablish the slip frequency of the motor in proportion to the desired motor torque condition.

7. The method of claim 2 wherein the step of reestablishing the slip frequency is further defined as energizing the stator winding with a stator current of a predetermined frequency and obtaining a slip frequency proportional to the desired torque condition as a result of a motor load induced alteration in the rotary condition of the motor rotor.

8. The method of claim 4 wherein the step of reestablishing the slip frequency is further defined as energizing the stator winding with a stator current of a predetermined frequency and obtaining a slip frequency proportional to the desired torque condition as a result of a motor load induced alteration in the rotary condition of the motor rotor.

9. The method of claim 7 including the step of concurrently limiting the alteration of the stator current magnitude and the slip frequency to predetermined values, thereby to limit the maximum torque condition of the motor.

10. The method of claim 8 including the step of concurrently limiting the alteration of the stator current magnitude and phase displacement and the alteration of the slip frequency to predetermined values, thereby to limit the maximum torque condition of the motor.

11. The method of claim 1 for producing a torque condition for driving the motor at a preselected speed, said method including the step of detecting a motor speed error, said method being further defined as concurrently establishing the slip frequency and stator current magnitude values responsive to the motor speed error for producing torque conditions in the motor tending to reduce the speed error.

12. The method of claim 1 for producing a torque condition for driving the motor at a preselected speed, said method including the step of detecting a motor speed error, said method being further defined as concurrently establishing the slip frequency, stator current magnitude, and stator current phase displacement values responsive to the motor speed error for producing torque conditions in the motor tending to reduce the speed error.

13. The method of claim 11 including the further step of concurrently limiting the slip frequency and stator current magnitude under excessive speed error conditions to limit the output torque condition of the motor.

14. The method of claim 12 including the further step of concurrently limiting the slip frequency, stator current magnitude, and stator current phase displacement under excessive speed error conditions to limit the output torque condition of the motor.

15. The method of claim 1 wherein the step of establishing the magnitude of the stator current is further defined as providing an adjustable unidirectional current and the step of establishing the frequency of the stator current is further defined as cyclically directing the unidirectional current to the stator winding.

16. The method of claim 1 wherein the step of establishing the magnitude of the stator current is further defined as establishing the magnitude of the stator current at the desired value regardless of the voltage condition of the induction motor, to permit motoring and regenerative operation of the induction current motor.

17. The method of claim 1 wherein the step of establishing the magnitude of the stator current is further defined as providing an adjustable unidirectional current and the step of establishing the frequency of the stator current is further defined as cyclically directing the unidirectional current to the stator winding.

18. The method of claim 1 wherein the step of establishing the magnitude of the stator current is further defined as establishing the magnitude of the stator current at the desired value regardless of the voltage condition of the induction motor, to permit motoring and regenerative operation of the induction motor.

19. The method of claim 1 further defined as including the steps of:
providing a signal quantitatively proportional to the torque condition to be developed in the motor;
modifying the torque condition signal to provide a stator current magnitude control signal, said modification occurring as a predetermined function of the quantitative characteristic motor torque condition signal and independently of the ascertainment of existing motor conditions; and
establishing the magnitude of the stator current in accordance with the stator current magnitude control signal concurrently with the establishment of the slip frequency.

20. The method of claim 19 wherein the stator winding is energized by a stator current phase displaceable with respect to a flux producing exciting current, said method being further defined as including the steps of:
modifying the torque condition signal to provide a stator current phase displacement control signal, said modification occurring as a predetermined function of the quantitative characteristic of the motor torque condition signal and independently of the ascertainment of existing motor conditions; and
establishing the phase displacement of the stator current with respect to the flux producing exciting current in accordance with phase displacement control signal, said establishment occurring concurrently with the establishment of the stator magnitude and the slip frequency.

21. The method according to claim 19 further defined as including the steps of:
establishing the frequency of the stator current responsive to the sensed rotor frequency at that of the rotor frequency;
altering the frequency of the stator current in accordance with the quantitative characteristic of the torque condition signal to provide a slip frequency proportional to desired torque, said establishment of slip frequency occurring concurrently with the establishment of the magnitude of the stator current.

22. The method according to claim 20 further defined as including the steps of:
establishing the frequency of the stator current responsive to the sensed rotor frequency to that of the rotor frequency;
altering the frequency of the stator current in accordance with the quantitative characteristic of the torque condition signal to provide a slip frequency proportional to desired torque, said establishment of slip frequency occurring concurrently with the establishment of the magnitude and phase displacement of the stator current.

23. The method of claim 19 further defined as including the steps of:
providing a stator current frequency signal;
energizing the stator winding of the motor with a stator current having a frequency proportional to the stator winding frequency signal to establish the motor slip frequency in accordance with the motor load controlled rotary condition of the motor rotor;
sensing the rotary condition of the motor rotor and providing a rotor frequency signal;
comparing the rotor frequency signal with the stator current frequency signal to provide an indication of slip frequency and the modifiable motor torque condition signal for establishing the magnitude of the stator current.

24. The method of claim 20 further defined as including the steps of:
providing a stator current frequency signal;
energizing the stator winding of the motor with a stator current having a frequency proportional to the stator winding frequency signal to establish the motor slip frequency in accordance with the motor load controlled rotary condition of the motor rotor;
sensing the rotary condition of the motor rotor and providing a rotor frequency signal;
comparing the rotor frequency signal with the stator current frequency signal to provide an indication of slip frequency and the modifiable motor torque condition signal for establishing the magnitude and phase displacement of the stator current.

25. The method of claim 23 including the step of concurrently limiting the stator current magnitude and motor slip frequency to predetermined values, thereby to limit the maximum torque condition of the motor.

26. The method of claim 24 including the step of concurrently limiting the stator current magnitude and phase displacement and motor slip frequency to predetermined values, thereby to limit the maximum torque condition of the motor.

27. The method of claim 25 further defined as limiting the quantitative characteristic of the motor torque condition signal to limit the stator current magnitude and altering the frequency of the stator current to limit the magnitude of the slip frequency.

28. The method of claim 26 further defined as limiting the quantitative characteristic of the motor torque condition signal to limit the stator current magnitude and phase displacement and altering the frequency of the stator current to limit the magnitude of the slip frequency.

29. The method of claim 19 for producing a torque condition for driving the motor at a preselected speed including the step of detecting the motor speed error and providing a signal proportional to speed error as the motor torque condition signal, said method being further defined as concurrently establishing the slip frequency and stator current magnitude values responsive to motor speed error for producing torque conditions in the motor tending to reduce the speed error.

30. The method of claim 20 for producing a torque condition for driving the motor at a preselected speed including the step of detecting motor speed error and providing a signal proportional to speed error as the motor torque condition signal, said method being further defined as concurrently establishing the magnitude and phase displacement of the stator current and the slip frequency developed in the motor responsive to motor speed error for producing torque conditions in the motor tending to reduce the speed error.

31. The method of claim 29 including the further step of concurrently limiting the slip frequency and stator current magnitude under excessive speed error conditions to limit the output torque condition of the motor.

32. The method of claim 31 further defined as limiting the speed error signal to limit slip frequency and stator current magnitude.

33. The method of claim 30 including the further step of concurrently limiting the slip frequency and stator current magnitude and phase displacement under excessive speed error conditions to limit the output torque condition of the motor.

34. The method of claim 33 further defined as limiting the speed error signal to limit slip frequency and stator current magnitude and phase displacement.

35. The method of claim 21 further defined as a method of changing the condition of the motor from an existing torque condition to a newly desired torque condition, said method being further defined as including the steps of:
  altering the quantitative characteristic torque condition signal in accordance with the newly desired torque condition;
  modifying the altered torque condition signal to provide a stator current magnitude control signal, said modification occurring as a predetermined function of the quantitative characteristic motor torque condition signal and independently of the ascertainment of existing motor conditions;
  reestablishing the magnitude of the stator current in accordance with the stator current magnitude control signal; and
  altering the frequency of the stator current in accordance with the altered quantitative characteristic of the torque condition signal to reestablish the slip frequency proportional to the newly desired torque condition, said reestablishment of the slip frequency occurring concurrently with the reestablishment of the stator current.

36. The method of claim 35 wherein the stator winding is energized by a stator current phase displaceable with respect to a flux producing exciting current, said method being further defined as including the steps of:
  modifying the altered torque condition signal to provide a stator current phase displacement control signal, said modification occurring as a predetermined function of the quantitative characteristic of the motor torque condition signal and independently of the ascertainment of existing motor conditions; and
  reestablishing the phase displacement of the stator current with respect to the flux producing exciting current in accordance with phase displacement control signal, said reestablishment occurring concurrently with the reestablishment of the stator magnitude and the slip frequency.

37. The method of claim 23 further defined as a method of changing the condition of the motor from an existing condition to a newly desired condition including the steps of:
  altering a stator current frequency signal;
  energizing the stator winding of the motor with an altered stator current having a frequency proportional to the altered stator winding frequency signal to reestablish the motor slip frequency in accordance with the motor load controlled rotary condition of the motor rotor and to alter the motor torque condition;
  modifying the altered torque condition signal to provide a stator current magnitude control signal, said modification occurring as a predetermined function of the quantitative characteristic motor torque condition signal and independently of the ascertainment of existing motor conditions; and
  establishing the magnitude of the stator current in accordance with the stator current magnitude control signal.

38. The method of claim 37 wherein the stator winding is energized by a stator current phase displaceable with respect to a flux producing exciting current, said method being further defined as including the steps of:
  modifying the altered torque condition signal to provide a stator current phase displacement control signal, said modification occurring as a predetermined function of the quantitative characteristic of the motor torque condition signal and independently of the ascertainment of existing motor conditions; and
  establishing the phase displacement of the stator current with respect to the flux producing exciting current in accordance with phase displacement control signal, said establishment occurring concurrently with the establishment of the stator magnitude.

* * * * *